Oct. 23, 1962   E. R. ZIEGLER   3,059,264
WINDSHIELD WIPER PARKING SWITCH
Filed Jan. 13, 1961   2 Sheets-Sheet 1

INVENTOR.
EUGENE R. ZIEGLER
BY
Paul J. Reising
HIS ATTORNEY

Oct. 23, 1962 E. R. ZIEGLER 3,059,264
WINDSHIELD WIPER PARKING SWITCH
Filed Jan. 13, 1961 2 Sheets-Sheet 2

INVENTOR.
EUGENE R. ZIEGLER
BY
Paul J. Reising
HIS ATTORNEY

United States Patent Office 3,059,264
Patented Oct. 23, 1962

3,059,264
WINDSHIELD WIPER PARKING SWITCH
Eugene R. Ziegler, Spencerport, N.Y., assignor to General Motors Corporation, Detroit, Mich., a corporation of Delaware
Filed Jan. 13, 1961, Ser. No. 82,464
10 Claims. (Cl. 15—250.17)

The present invention relates to vehicle wind-shield wipers and has as its principal object the provision of a windshield wiper drive mechanism having improved switch means for assuring that the wipers assume their park position when the system is deenergized by the vehicle operator. More specifically, it is an object of the present invention to provide a windshield wiper parking switch mechanism which has increased life due to less wear on critical parts and which also provides greater reliability by assuring against the freezing or sticking of the switch contacts in their closed position. Briefly the invention comprehends a windshield wiper parking switch arrangement wherein the wipers are driven by a mechanism which includes a rotary member, such as a gear, which is formed with a relatively short arcuate cam positioned to pass between and separate a pair of electrical contact carrying springs during each revolution of the member, the cam being oriented on the rotating member such that when it is in a position between the electrical contact springs, the wipers are in their park position. The pair of electrical contact springs constitute a wiper motor switch which is in parallel with the manually operable windshield wiper switch in the vehicle compartment. Hence, when the manually operable switch is closed, the wipers operate irrespective of the rotary position of the cam; however when the manually operable switch is opened, deactuation of the wiper motor occurs only when the cam reaches its rotary position between the springs at which time the wipers are in their park position.

The above and other objects and features of the invention will appear more clearly from the following detailed description of a preferred embodiment thereof made with reference to the accompanying drawings in which.

Figure 2:
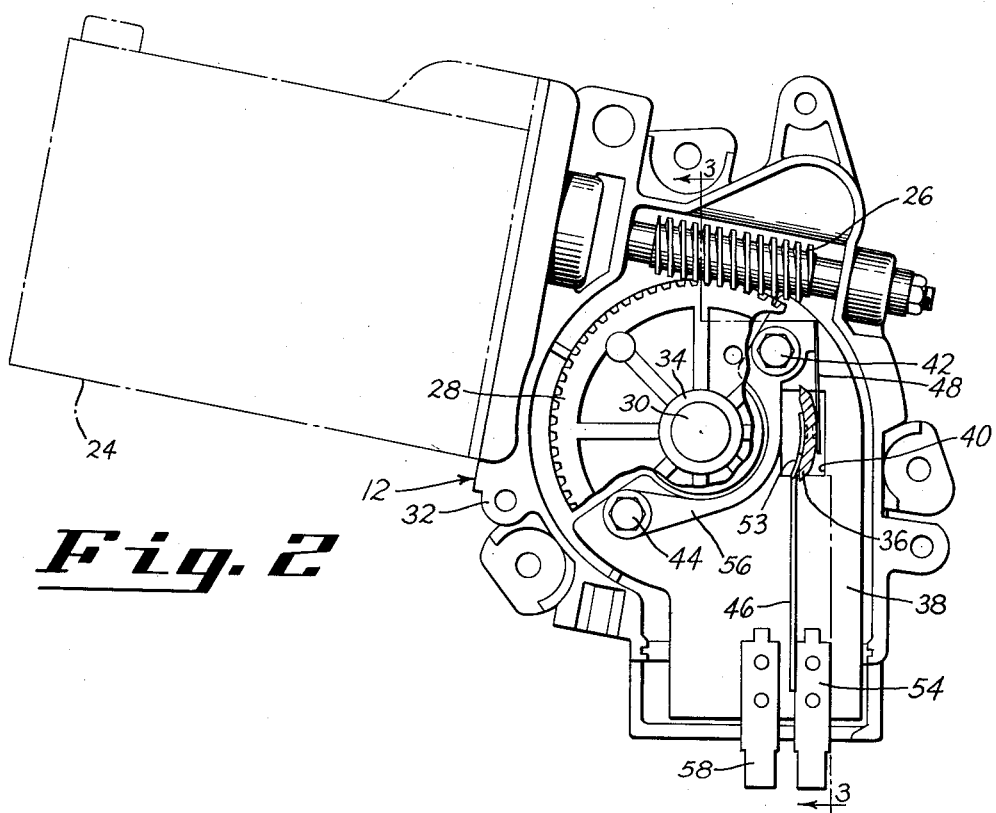
FIGURE 2 is a view taken along line 2—2 of FIGURE 1 but with parts broken away.
Figure 3:
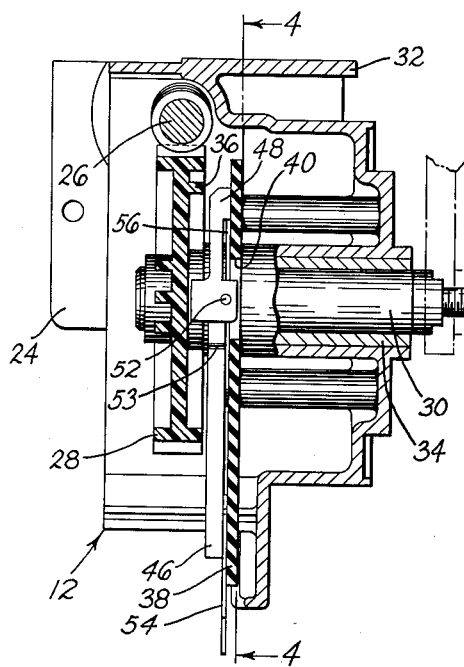
Figure 4:
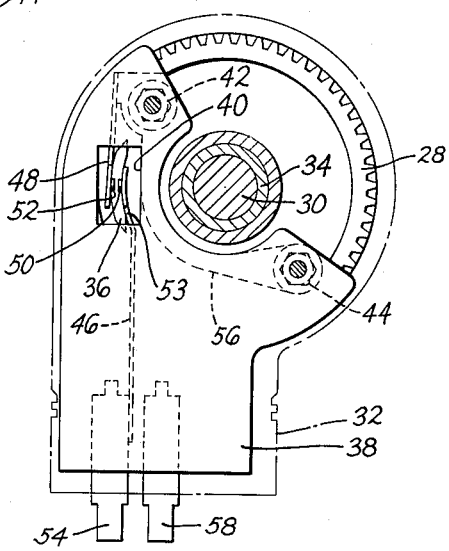
Figure 5:
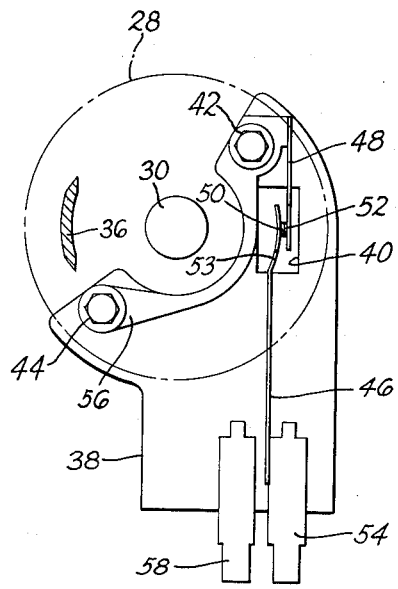
Figure 6:
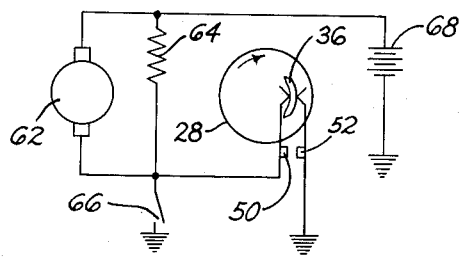

FIURE 3 is a view taken on the line 3—3 of FIGURE 2 but with the switch contacts in their closed position;

FIGURE 4 is a view taken on the line 4—4 of FIGURE 3 but with the switch contacts in their open position;

FIGURE 5 is a view substantially similar to FIGURE 4 but seen from the opposite side and with the contacts in their closed position; and FIGURE 6 is a schematic view of the switch circuit.

Figure 1:
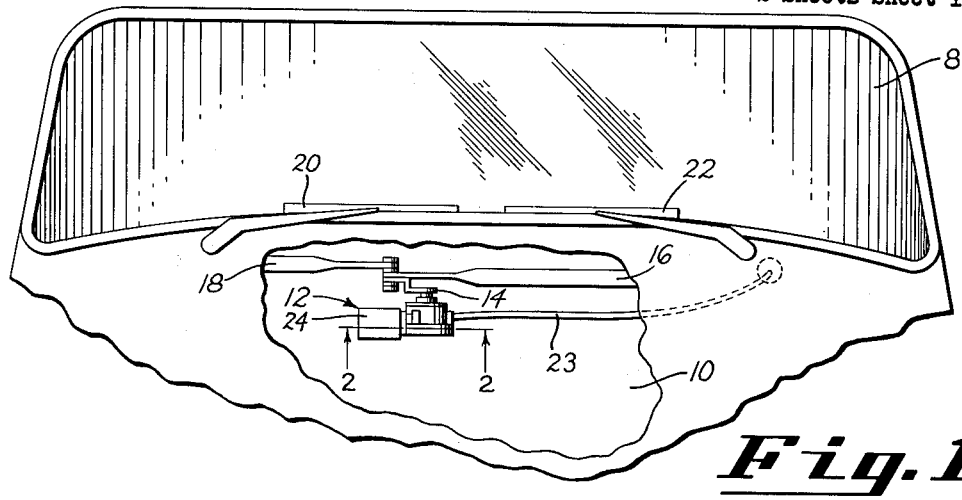
FIGURE 1 is a fragmentary view in elevation, with parts broken away, of a vehicle having a windshield wiper mechanism embodying the invention.

Referring now to FIGURE 1, there is shown an automobile having a windshield 8, and a firewall 10 with the windshield wiper drive mechanism 12 secured thereto. The drive mechanism turns a crank 14 which reciprocates connecting rods 16 and 18 pivotally secured thereto, the outer ends of the connecting rods being operatively connected with windshield wipers 20 and 22 to cause arcuate movement thereof across the windshield. The windshield wipers are shown in their park position and, as indicated above, the subject matter of this invention is the switch means within the drive mechanism 12 which assures that the wipers will be turned to this position after the vehicle operator has moved the wiper control to its "off" position. The lead cable for the "on-off" control within the passenger compartment of the vehicle is shown at 23.

Referring now to FIGURES 2 through 5, the drive mechanism includes an electric motor 24 having its drive shaft formed as or secured to a worm 26 which drives a worm gear 28 made of nylon or other suitable molded plastic. Shaft 30 of the worm gear is rotatably supported in housing 32 by a brass bearing sleeve 34, and the crank 14 is secured to the outer end of the shaft for rotation thereby.

Worm gear 28 is formed with an arcuate cam lug 36 having pointed ends, this cam lug extending outwardly from the gear webbing between and concentric to the shaft 30 and the gear's outer periphery. A pressed paper or plastic terminal plate 38 having an opening 40 therein is fixedly secured within the housing in a plane parallel to that of the worm gear 28 by a pair of threaded members 42 and 44, the opening 40 being positioned the same distance from the shaft 30 as is the arcuate cam lug 36. A pair of metal leaf spring blades 46 and 48 secured to the terminal plate at opposite ends thereof extend toward each other and terminate at about the center of the opening 40 in enlarged generally T-shaped end portions having formed or secured on the opposed inner faces thereof electrical contacts 50 and 52 which are normally biased into contact with each other by the inherent spring pressure of the spring blades. It will be noted that the end portions of the spring blades extend generally perpendicularly to the terminal plate and lie in the rotary path of the cam lug 36 such that as the worm gear rotates, the cam lug is required to pass between the enlarged ends of the spring blades, as shown in FIGURES 1 and 4, and, in doing so, bias the blades outwardly with respect to each other thereby opening the electrical connection between electrical contacts 50 and 52. The end portion of spring 46 is arcuate-shaped as shown at 53 to assure easy entrance and passage of the cam lug between the blades.

In the particular embodiment shown, spring blade 46 is secured to the terminal plate by an integral terminal portion 54 which is bent at a right angle to the blade and is riveted to the plate, and the spring blade 48 is secured by an integral yoke-shaped portion 56 fastened to the terminal plate by the threaded members 42 and 44 which serve as a ground connection. Blade 46 is connected through its terminal 54 to the motor by a suitable conductor (not shown) and also to ground through the manually operable switch on the vehicle instrument panel. Terminal 58 is connected by a suitable conductor (not shown) to the motor and on the other side to the vehicle battery. The circuit for the system is shown in FIGURE 6 wherein 62 and 64 are the electric motor armature and field, respectively 66 the manually operable windshield wiper switch on the vehicle instrument panel and 68 the vehicle battery. It will be noted that when the manually operable switch 66 is closed the windshield wiper motor will be caused to operate irrespective of the rotary position of the cam 36; however, when switch 66 is open the motor will continue to operate only as long as cam 36 is in a rotary position other than between the spring blades, and when the cam passes between the spring blades as schematically shown in FIGURE 6, the contacts 50 and 52 are opened thereby deenergizing the motor. The length of the arcuate cam lug 36 is sufficient to allow the normal amount of motor coast as the motor is deenergized; the cam opens the electrical contacts when it first enters between the spring blades and coasts to complete rest with its center or rear portion still between the spring blades.

The crank arm 14 is, of course, secured to the shaft 30 such that when the cam 36 is between the spring blades the windshield wipers 20 and 22 are in their park positions as shown in FIGURE 1.

Because of the short period of physical contact between the cam 36 and the electrical contact moving elements during each revolution of the worm gear, there is relatively little wear on the cam or elements during operation of the device thereby providing the switch with an exceptionally long useful life. Another important advantage to the structure is that it provides assurance against malfunction due to freezing or sticking of the electrical contacts, this because the cam 36 forces separation of the contacts and thereby precludes their sticking together.

It will be understood that while the invention has been described by reference to a particular and preferred embodiment thereof, various changes and alterations may be made, all within the form and intended scope of the claims which follow.

I claim:

1. A windshield wiper mechanism comprising a rotatable member driven by a motor and operatively connected to drive a windshield wiper, a pair of members adjacent said rotatable member spring biased towards each other to effect an electrical connection to said motor, and a cam on said rotatable member positioned to pass between and cause separation of said pair of members and thereby open the electrical connection to said motor when the wiper is in a predetermined position.

2. A windshield wiper mechanism comprising a rotatable member driven by a motor and operatively connected to drive a windshield wiper, a pair of metal members adjacent said rotatable member normally spring biased into contact with each other to form an electrical connection to said motor, and a cam on said rotatable member positioned to pass between and cause separation of said metal members and thereby open the electrical connection to said motor when the wiper is in a predetermined position.

3. A windshield wiper mechanism comprising a rotatable member driven by a motor and operatively connected to drive a windshield wiper, a pair of metal leaf spring blades adjacent said rotatable member biased towards each other to effect an electrical connection to said motor, and a cam on said rotatable member positioned to pass between said leaf spring blades and thereby open the electrical connection to said motor when the wiper is in a predetermined position.

4. A windshield wiper mechanism comprising a gear rotatable by a motor and operatively connected to drive a windshield wiper, a pair of leaf spring blades adjacent said gear and biased towards each other to effect an electrical connection to said motor, and a relatively short arcuate cam of insulating material on said gear concentric with the periphery thereof and positioned to pass between said blades and thereby open the electrical connection to said motor when the wiper is in a predetermined position.

5. A windshield wiper mechanism comprising a gear of electrically insulative material rotatable by a motor and operatively connected to drive a windshield wiper, a pair of metal leaf spring blades adjacent and extending substantially perpendicular to the plane of rotation of said gear, said blades being biased towards each other to effect an electrical connection to said motor, and a relatively short arcuate cam with pointed ends formed on said gear and positioned to pass between said blades and thereby open the electrical connection to said motor when the wiper is in a predetermined position.

6. A windshield wiper mechanism comprising a rotatable member driven by a motor and operatively connected to drive a windshield wiper, a pair of leaf spring blades adjacent said rotatable member, said blades carrying electrical contacts adjacent the ends thereof normally biased by the inherent spring pressure of said blades into contact with each other to form an electrical connection to said motor, and a cam on said rotatable member positioned to pass between said blades and cause separation of said contacts to thereby open the electrical connection to said motor when the wiper is in a predetermined position.

7. A windshield wiper mechanism comprising a housing, a gear of electrically insulative plastic material in said housing driven by a motor and operatively connected to drive a windshield wiper, an insulative terminal plate in said housing, a pair of leaf spring blades secured to said plate adjacent said gear, said blades having end portions extending substantially perpendicular to the plane of rotation of said gear and carrying electrical contacts normally biased into contact with each other by the inherent spring pressure of said blades to form an electrical connection to said motor, and a short arcuate-shaped cam with pointed ends formed on said gear and positioned to pass between said blades and cause separation of said contacts to thereby open the electrical connection to said motor when the wiper is in a predetermined position.

8. Windshield wiper mechanism comprising, an electric motor, a rotatable gear driven by said motor, a pair of leaf spring switch blades mounted adjacent said gear and inherently biased towards each other to complete an energizing circuit for said motor, and a relatively short arcuate cam of insulating material on said gear coaxial therewith and arranged to engage and deflect at least one of said blades during each revolution of said gear and thereby open said energizing circuit to the motor.

9. Windshield wiper mechanism comprising, an electric motor, a rotatable gear of insulating material driven by said motor, a pair of leaf spring switch blades mounted adjacent said gear and extending substantially perpendicular to the plane of rotation of said gear, said switch blades being inherently biased towards each other to complete an energizing circuit for said motor, and a relatively short arcuate cam with pointed ends formed on said gear and arranged to engage and deflect at least one of said switch blades during each revolution of said gear to open said energizing circuit.

10. Windshield wiper mechanism comprising, an electric motor, a gear box housing attached to said motor, a rotatable gear of insulating material journalled in said housing and driven by said motor, an insulative terminal plate attached to said housing, a pair of leaf spring switch blades secured to said blade adjacent said gear, said switch blades having end portions extending substantially perpendicular to the plane of rotation of said gear and carrying electrical contacts inherently biased towards each other to complete an energizing circuit for said motor, and a short arcuate-shaped cam formed on said gear and arranged to engage at least one of said switch blades during each revolution of said gear to open said energizing circuit.

References Cited in the file of this patent

UNITED STATES PATENTS 2,357,152    Whitted _____ Aug. 29, 1944

FOREIGN PATENTS 1,014,186    France _____ May 23, 1952
1,074,424    France _____ Apr. 4, 1953